United States Patent
Hulin

(10) Patent No.: US 7,179,160 B2
(45) Date of Patent: Feb. 20, 2007

(54) AUTOMATED APPARATUS AND SYSTEM FOR COOKING, DRYING AND PEELING SHELLFISH PRODUCTS

(76) Inventor: Michael J Hulin, 3501 Highway 319, Cypremort Point, LA (US) 70538

( * ) Notice: Subject to any disclaimer, the term of this patent is extended or adjusted under 35 U.S.C. 154(b) by 51 days.

(21) Appl. No.: 10/779,872

(22) Filed: Feb. 17, 2004

(65) Prior Publication Data

US 2005/0186893 A1    Aug. 25, 2005

(51) Int. Cl.
*A22C 29/02*    (2006.01)

(52) U.S. Cl. .............................. 452/2; 99/535; 99/539; 99/568

(58) Field of Classification Search .............. 452/1–5, 452/7–13, 18; 99/324, 357, 360, 403, 404, 99/535, 539, 540, 567, 568
See application file for complete search history.

(56) References Cited

U.S. PATENT DOCUMENTS

| | | | | |
|---|---|---|---|---|
| 2,047,688 A | * | 7/1936 | Jenkins | 452/14 |
| 3,594,860 A | * | 7/1971 | Nelson et al. | 452/14 |
| 3,665,555 A | * | 5/1972 | Willis | 452/19 |
| 3,722,035 A | * | 3/1973 | Hanks | 452/14 |
| 3,988,805 A | * | 11/1976 | Martin | 452/14 |
| 4,330,904 A | * | 5/1982 | Lambert | 452/14 |
| 4,532,677 A | * | 8/1985 | Wenstrom et al. | 452/19 |
| 4,660,468 A | * | 4/1987 | Goldhahn | 99/470 |
| 4,769,870 A | * | 9/1988 | Hansen et al. | 452/5 |
| 4,829,636 A | * | 5/1989 | Caroon | 452/9 |
| 4,862,794 A | * | 9/1989 | Lapeyre et al. | 99/443 C |
| 4,916,775 A | * | 4/1990 | Gallant | 452/14 |
| 4,966,072 A | * | 10/1990 | Ellis-Brown | 99/443 C |
| 5,059,151 A | * | 10/1991 | Kiczek | 452/13 |
| 5,246,118 A | * | 9/1993 | Mosher | 209/592 |
| 5,651,731 A | * | 7/1997 | Gorans et al. | 606/164 |
| 5,928,072 A | * | 7/1999 | Fulcher et al. | 452/1 |
| 6,117,003 A | * | 9/2000 | Brinson | 452/31 |
| 6,372,275 B1 | * | 4/2002 | Hulin | 426/479 |

* cited by examiner

*Primary Examiner*—Peter M. Poon
*Assistant Examiner*—David Parsley
(74) *Attorney, Agent, or Firm*—Jack Schwartz & Associates, PLLC

(57) ABSTRACT

A fully automated apparatus and system for processing shellfish such as shrimp and crawfish including the cooking, drying and peeling thereof. The present invention utilizes excessive heat generated by boilers to heat the dryers. The product is cooked in a brine mix that once used is transferred to a broth processing system to make a seafood flavored broth and is also injected as a fine mist into a furnace where it crystallizes into a solid product to be used as a seafood flavored salt.

46 Claims, 14 Drawing Sheets

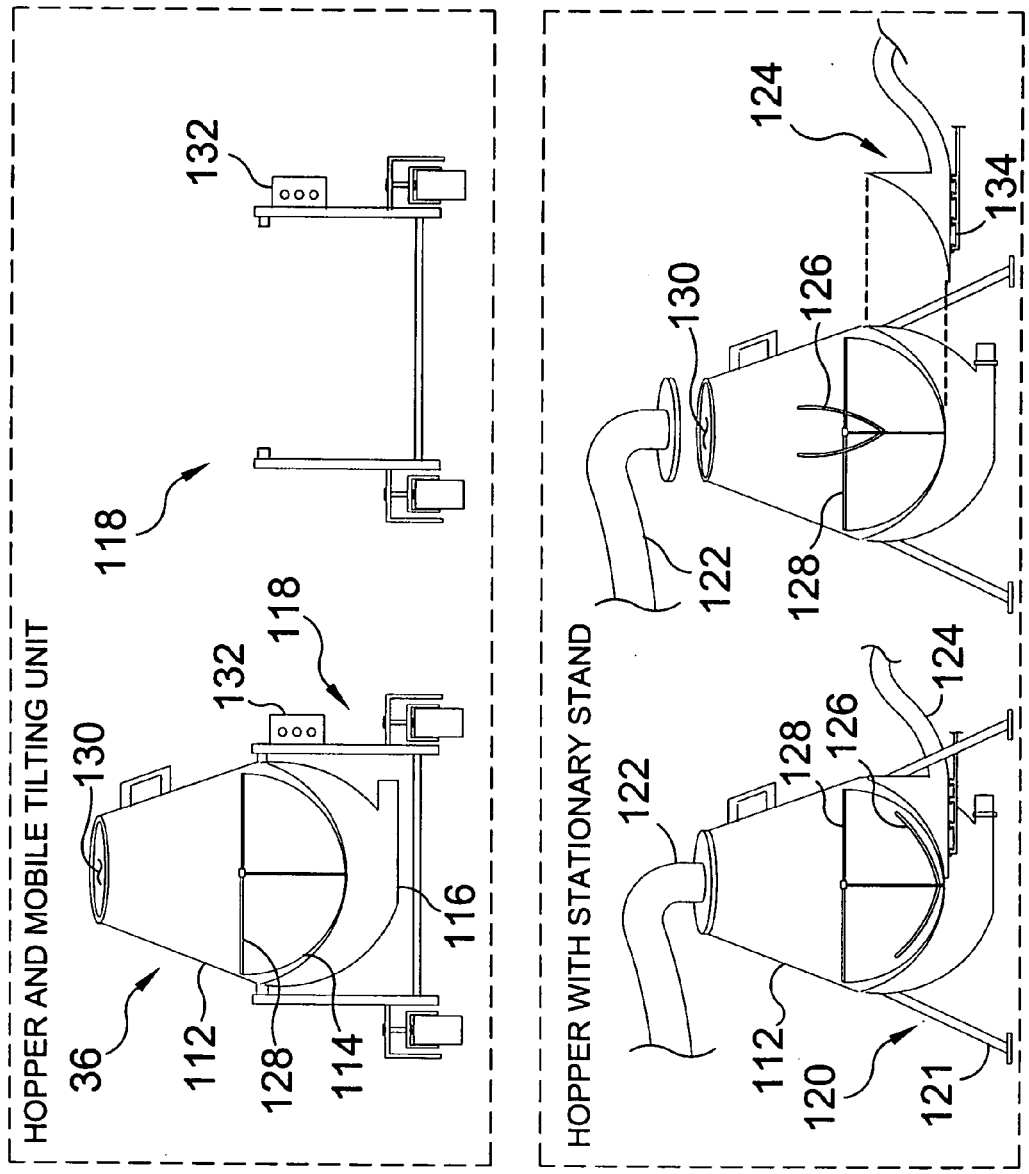

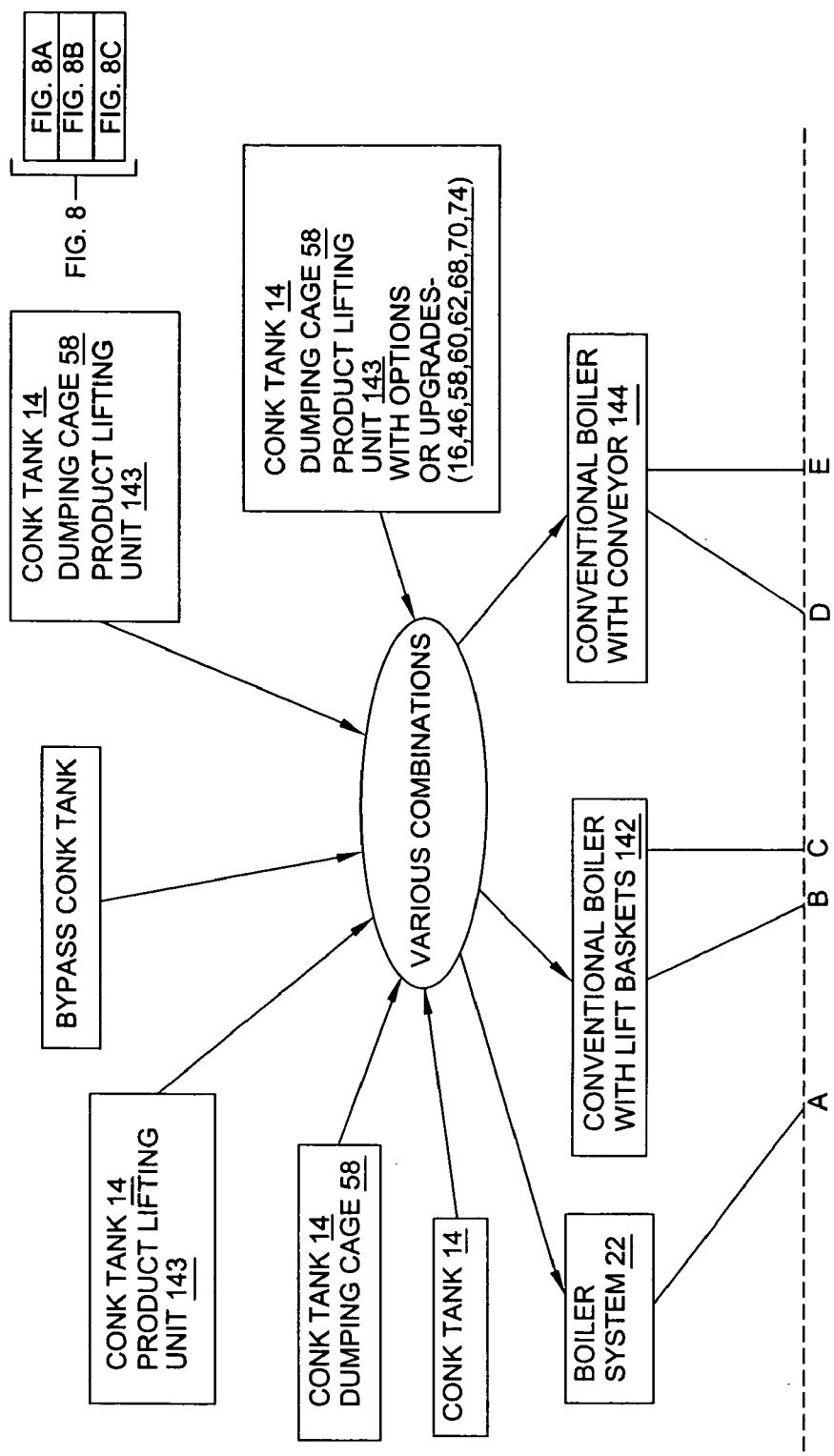

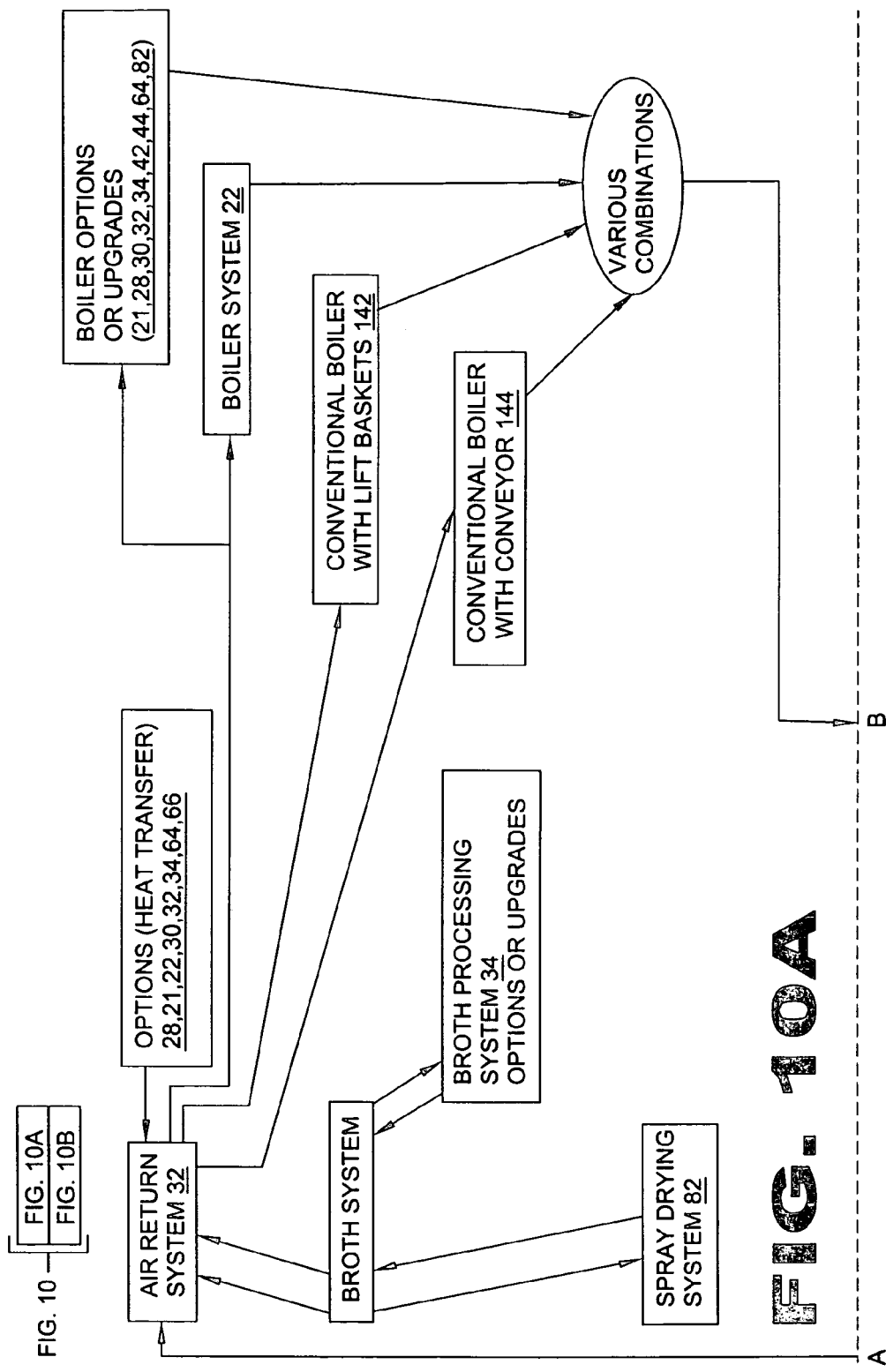

AUTOMATED APPARATUS AND SYSTEM FOR COOKING, DRYING AND PEELING SHELLFISH PRODUCTS

BACKGROUND OF THE INVENTION

1. Field of the Invention

The present invention relates generally to shrimp processing and, more specifically, to a method and apparatus for boiling, drying, peeling and size grading shellfish products such as shrimp and crawfish while simultaneously utilizing the by-products to process broth and salt. The present invention includes a fully automated means for processing shrimp, broth, salt, food additives, animal feed and fertilizer and moving the product from the loading dock to a finished product storage area without the need of human contact with the product thereby greatly reducing the risk of contamination and the cost of labor.

The procedures currently being used for processing shrimp require having personnel and employees manually dump the product into a conk tank and transfer it from one processing system into the next thereby exposing the food product to sweat, saliva, respiratory germs and the like. Furthermore, airborne contaminants also come in contact with the food product during processing, increasing the risk of causing sickness and disease to the consumer.

Furthermore, airborne contaminants also come in contact with the personnel during processing thereby increasing the risk of respiratory disease associated with the inhalation of sodium bisulphate and other harmful airborne contaminants.

The present invention seeks to alleviate these inherent dangers by eliminating the need for workers to come in contact with the product and providing a plurality of vacuums and cleaning systems to ensure a clean environment during processing. Automated conveyors serve to move the product from one system to the next from the loading dock to the storage tank. Each system involved in the processing is independent from the others and the conveyors are not attached thereby allowing a facility to upgrade current equipment to the completely automated system in steps.

2. Description of the Prior Art

There are other shellfish processing means known in the art. While these shrimp processors may be suitable for the purposes for which they were designed, they would not be as suitable for the purposes of the present invention, as hereinafter described.

SUMMARY OF THE PRESENT INVENTION

A primary object of the present invention is to provide a method and apparatus for processing shellfish that will add automation to the current process.

Another object of the present invention is to provide a fully automated method and apparatus for processing shrimp and crawfish that greatly reduces heat within the work area.

Yet another object of the present invention is to provide a fully automated method and apparatus for processing shrimp and crawfish that eliminates the contamination of product during the current drying system due to condensation which accumulates on ceiling and then drops onto product.

Still another object of the present invention is to provide a fully automated method and apparatus for processing shrimp and crawfish that eliminates the exposure to excessive perspiration from employees, which currently falls directly onto product while loading, raking (rotating) and unloading.

Yet another object of the present invention is to provide a fully automated method and apparatus for processing shrimp and crawfish that eliminates air contamination within the work area due to shrimp dust and possible preservatives such as sodium bisulphate that fishermen apply to raw product and that become airborne during the process.

Another object of the present invention is to provide a fully automated method and apparatus for processing shrimp and crawfish that eliminates the hands-on labor of loading and unloading raw product into the boiling system.

Still another object of the present invention is to provide a fully automated method and apparatus for processing shrimp and crawfish that eliminates the hands-on labor of loading and unloading boiled seafood into dryers.

Yet another object of the present invention is to provide a fully automated method and apparatus for processing shrimp and crawfish that eliminates the hands-on labor of loading and unloading of dried product into the peeling device.

Another object of the present invention is to provide a fully automated method and apparatus for processing shrimp and crawfish that eliminates the hands-on labor of rotating the product every thirty minutes during the drying process.

Still another object of the present invention is to provide a fully automated method and apparatus for processing shrimp and crawfish that eliminates the contamination transfer of shrimp dust from previous batches of product to subsequent batches of product.

Yet another object of the present invention is to provide a fully automated method and apparatus for processing shrimp and crawfish that eliminates the over-drying of smaller product and the under-drying of larger product while offering a perfectly dried product based on size.

Another object of the present invention is to provide a fully automated method and apparatus for processing shrimp and crawfish that eliminates the hands-on labor of hand picking debris from the finished product up to 66% above the present means.

Still another object of the present invention is to provide a fully automated method and apparatus for processing shrimp and crawfish that adds an additional smaller size of product, which is normally lost in the peeling process, thereby increasing the yield.

Yet another object of the present invention is to provide a fully automated method and apparatus for processing shrimp and crawfish that eliminates the breaking of the tips of the tails of the product, thereby having a great impact on the yield increase.

Another object of the present invention is to provide a fully automated method and apparatus for processing shrimp and crawfish that offers a cleaner product without damaging the finished product thereby removing the legs, heads and shells while leaving the tails intact.

Still another object of the present invention is to provide a fully automated method and apparatus for processing shrimp and crawfish that adds an easy means of sanitizing between batches of product whereas the prior art has no sanitizing means whatsoever.

Yet another object of the present invention is to provide a fully automated method and apparatus for processing shrimp and crawfish that eliminates the hands-on labor of sweeping up peelings and shrimp dust for shipment by packing the peelings and dust in 50-gallon drums.

Another object of the present invention is to provide a fully automated method and apparatus for processing shrimp and crawfish that offers a more cost-effective and energy-efficient process of drying by utilizing residual heat from the boilers and broth system to heat the dryers.

Still another object of the present invention is to provide a fully automated method and apparatus for processing shrimp and crawfish that will reduce the cost of the product on the consumer end thereby making it a more desirable product.

Another object of the present invention is to provide a fully automated method and apparatus for processing shrimp and crawfish that eliminates human contact therewith, thereby reducing the risk of contamination and the cost of labor.

Still another object of the present invention is to provide a fully automated method and apparatus for processing shrimp and crawfish wherein crates of iced shrimp are placed on a conveyor belt on the loading dock and transported to a tilt-dumping cage at the end thereof into which they are dropped so that the shrimp and ice fall into a conk tank and the crate is subsequently tossed aside by a removal bar to make room for the following crate thereby negating the need of manually dumping the product into the conk tank.

Yet another object of the present invention is to provide a fully automated method and apparatus for processing shrimp and crawfish including a conk tank filled with water wherein jetted water is used to separate conk shells and other heavy items which become trapped in the bottom of the tank while the lighter items which respond to the agitated water are moved to the transport system.

Still another object of the present invention is to provide a fully automated method and apparatus for processing shrimp and crawfish wherein the conk tank includes a conveyor system to transport the product to a primary seafood boiler.

Another object of the present invention is to provide a fully automated method and apparatus for processing shrimp and crawfish wherein the primary seafood boiler cooks the product at a predetermined temperature for a selected amount of time while jetted air serves to stir it during the boiling process.

Yet another object of the present invention is to provide a fully automated method and apparatus for processing shrimp and crawfish wherein the primary seafood boiler is supplied and replenished with brine or salt water (water with salt added) that is mixed in a brine mixing tank and stored in auxiliary boilers to maintain the fresh brine at a specific temperature until such time that it is to be introduced into the primary seafood boiler.

Still another object of the present invention is to provide a fully automated method and apparatus for processing shrimp and crawfish including a spray drying system wherein brine is extracted from the primary seafood boiler and injected into a heated furnace or hopper as a fine mist where it is almost immediately dehydrated thereby creating a solid product to be used as a seafood flavored salt or additive.

Another object of the present invention is to provide a fully automated method and apparatus for processing shrimp and crawfish wherein the product is transferred from the primary seafood boiler via a seafood dryer conveyor system where it is spread out and stirred by a plurality of spreader bars and rakes as it is cooled by high speed fans to terminate the cooking process in a thorough, uniform manner.

Yet another object of the present invention is to provide a fully automated method and apparatus for processing shrimp and crawfish wherein the product is transferred to dryers from the primary seafood boiler by a conveyor system rather than manually as is the current method used in the industry.

Still another object of the present invention is to provide a fully automated method and apparatus for processing shrimp and crawfish wherein the product is dried in stacked dryers and rotated periodically at a predetermined rate to ensure even drying.

Another object of the present invention is to provide a fully automated method and apparatus for processing shrimp and crawfish wherein the product is dried in spiral dryers that move the product in a spiral rotation to the top of the dryer where it is dumped through a chute back to the bottom and reloaded as the process is repeated.

Still another object of the present invention is to provide a fully automated method and apparatus for processing shrimp and crawfish that will vacuum dried product from the traditional box dryers into the peeling device described in this process.

Another object of the present invention is to provide a fully automated method and apparatus for processing shrimp and crawfish that is to vacuum dried product from the traditional tumbler peelers previously being used. Which is one step for upgrading the old method to this new system.

Yet another object of the present invention is to provide a fully automated method and apparatus for processing shrimp and crawfish wherein the dryers may be piggybacked with the product being transferred from one dryer to the next.

Still another object of the present invention is to provide a fully automated method and apparatus for processing shrimp and crawfish wherein the product is transferred from the dryers to a peeling device that will de-shell the product while keeping the tails intact.

Another object of the present invention is to provide a fully automated method and apparatus for processing shrimp and crawfish wherein the peeling device includes a spinning blade that causes the cleaned product to ride along the sides of an inner compartment which is smooth and allow the unclean product which is heavier and bulky to remain on the screen area.

Still another object of the present invention is to provide a fully automated method and apparatus for processing shrimp and crawfish that is simple and easy to use.

Still yet another object of the present invention is to provide a fully automated method and apparatus for processing shrimp and crawfish that is inexpensive to manufacture and operate.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which:

FIG. 7 is a front view of the peeling device and associated options;

FIG. 8A–8C is a block diagram showing the components and relationship for the seafood processing system;

FIG. 10A–10B is a block diagram of the heat recovery system; and

DESCRIPTION OF THE REFERENCED NUMERALS

Figure 1:
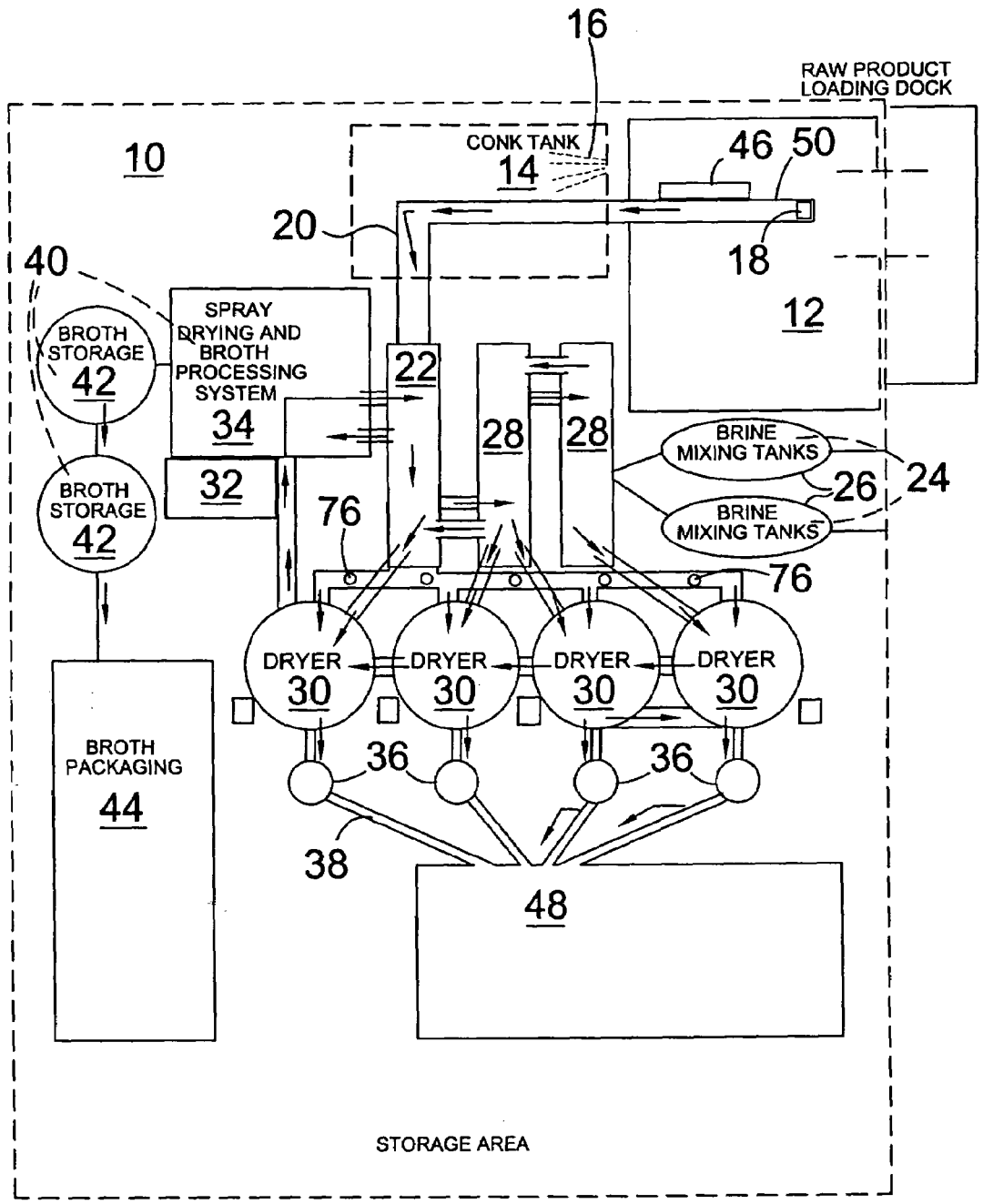
FIG. 1 is a schematic diagram of the present invention.

Turning now descriptively to the drawings, in which similar reference characters denote similar elements throughout the several views, the figures illustrate the Apparatus and System for Cooking, Drying and Peeling Shellfish Products of the present invention. With regard to the reference numerals used, the following numbering is used throughout the various drawing figures.

10 Shellfish Processing System
12 refrigerated loading dock
14 conk tank
16 jetted water
18 product
20 conveyor of 14
21 boiler system
22 primary seafood boiler
24 brine
26 brine mixing tank
28 auxiliary tanks
30 dryer
32 air return system
34 broth processing system
36 peeler
38 product transfer system
40 broth
42 broth storage tank
44 broth packaging
46 raw product testing
48 packaging room
50 loading dock conveyor
52 crate
54 ice
56 dumping cage conveyor
58 dumping cage
60 paddle wheel
62 ice guard
64 hot air manifold
66 conduit
68 random test of raw product
70 foreign substance/chemical detection sensors
72 gross weight monitoring
74 salinity monitoring sensors
76 high speed fans
78 spreader bars
80 rakes
82 spray drying system
84 product tracking
86 rheostats
88 timers
90 aerated conveyor belt
92 seafood dryer conveyor
94 humidity/moisture sensors
96 conveyor sensors
98 timer of 50
100 sanitizing system
102 collection system
104 vacuum system
106 air flow controls
108 air contaminate sensors
110 video monitoring
112 hopper of 36
114 screen of 36
116 motor-power source of 36
118 tilting unit
120 stationary stand
121 legs of 120
122 loading device
124 unloading device
126 screen sweeper
128 blade
130 opening of 112
132 control panel of 118
134 jets of 124
135 conventional tumbler (peeling device)
136 enhanced peeling device
138 peeler hinged access port
139 conventional leading means
140 sensors
141 conventional dust collection system
142 conventional boiler with screen baskets
143 product lifting unit
144 conventional boiler with conveyor
146 conventional dryers
148 stacked conveyor dryer (manual load and unload)
150 enhanced stacked conveyor dryer
152 spiral conveyor dryer
154 enhanced spiral conveyor dryer

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is a schematic diagram of the present invention 10. Raw product 18 is crated in ice and introduced to the present invention 10 at a refrigerated loading dock 12 where raw product testing 46 is randomly performed to check for contaminants prior to being transferred to a conk tank 14 that serves to separate heavier items such as conk shells that become trapped in the lower section thereof. Jetted water 16 is injected into the conk tank 14 to agitate the contents therein, thereby moving the product 18 to a conk tank conveyer 20 for transferal to a primary seafood boiler 22 filled with a brine 24 mix of salt and water that is prepared in brine mixing tanks 26 and stored in auxiliary boilers 28 to maintain the brine 24 at a specific temperature until ready for distribution to the primary seafood boiler 22. Once the product 18 is fully cooked, it is transferred to at least one dryer 30, with all dryers 30 supplied with hot air by an air return system 32 that transfers residual heat from all related heat generating equipment such as the boilers 22,28, the broth processing system 34 and the like. The product 18 is subsequently delivered to the peelers 36 for deshelling once adequately dried by means of a product transfer system 38 that initially vacuums the smaller product 18 from the dryers 30 and continues to separate the product 18 by size as the suction of the vacuum gradually increases, thereby enabling the transfer system 38 to lift increasingly larger product 18 to the peeler 36. The transfer system 38 is filtered to remove harmful contaminates such as bisodium sulfate.

Used brine 24 is removed from the primary seafood boiler 22 and transported to a broth processing system 34 for the development of a seafood flavored broth 40 that is then stored in broth storage tanks 42 prior to broth packaging 44.

Figure 2:
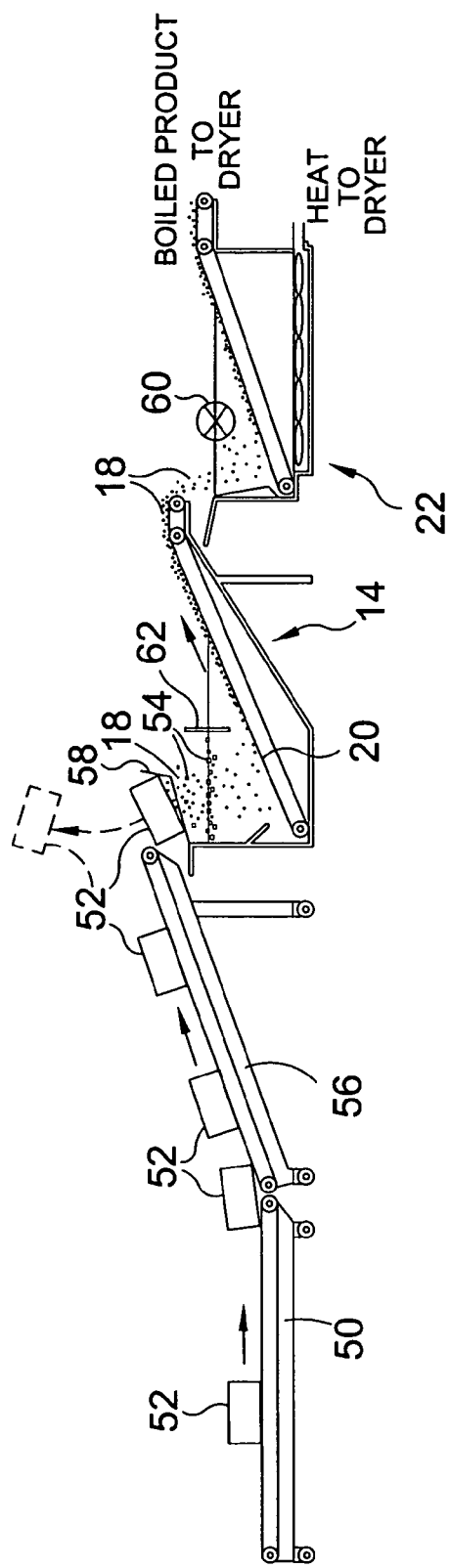
FIG. 2 is a diagrammatic view of the product from the loading dock to the primary seafood boiler.

FIG. 2 is a diagrammatic view of the movement of the product 18 from the refrigerated loading dock 12 to the primary seafood boiler 22 of the present invention 10. The product 18 is delivered to the loading dock conveyor 50 packed in crates 52 with ice 54 and transported to the inclined dumping cage conveyor 56 and tumbles into the dumping cage 58 thereby allowing the ice 54 and product 18 to fall into the conk tank 14. The dumping cage 58 then rejects the empty crate 52 and tosses it aside to allow the following crate 52 to drop therein. A plate-like vertical ice guard 62 traverses the width of the conk tank 14 and extends above and below the water surface to prevent the floating ice 54 from contacting the conk tank conveyor 20. The product 18 travels along on the conk tank conveyor 20 and is then delivered into the primary seafood boiler 22 where it is cooked at a predetermined temperature for a specific amount of time. At least one agitation means, such as the paddle wheel 60 shown, is provided to stir the product 18 to allow for the uniform cooking thereof.

Figure 3:
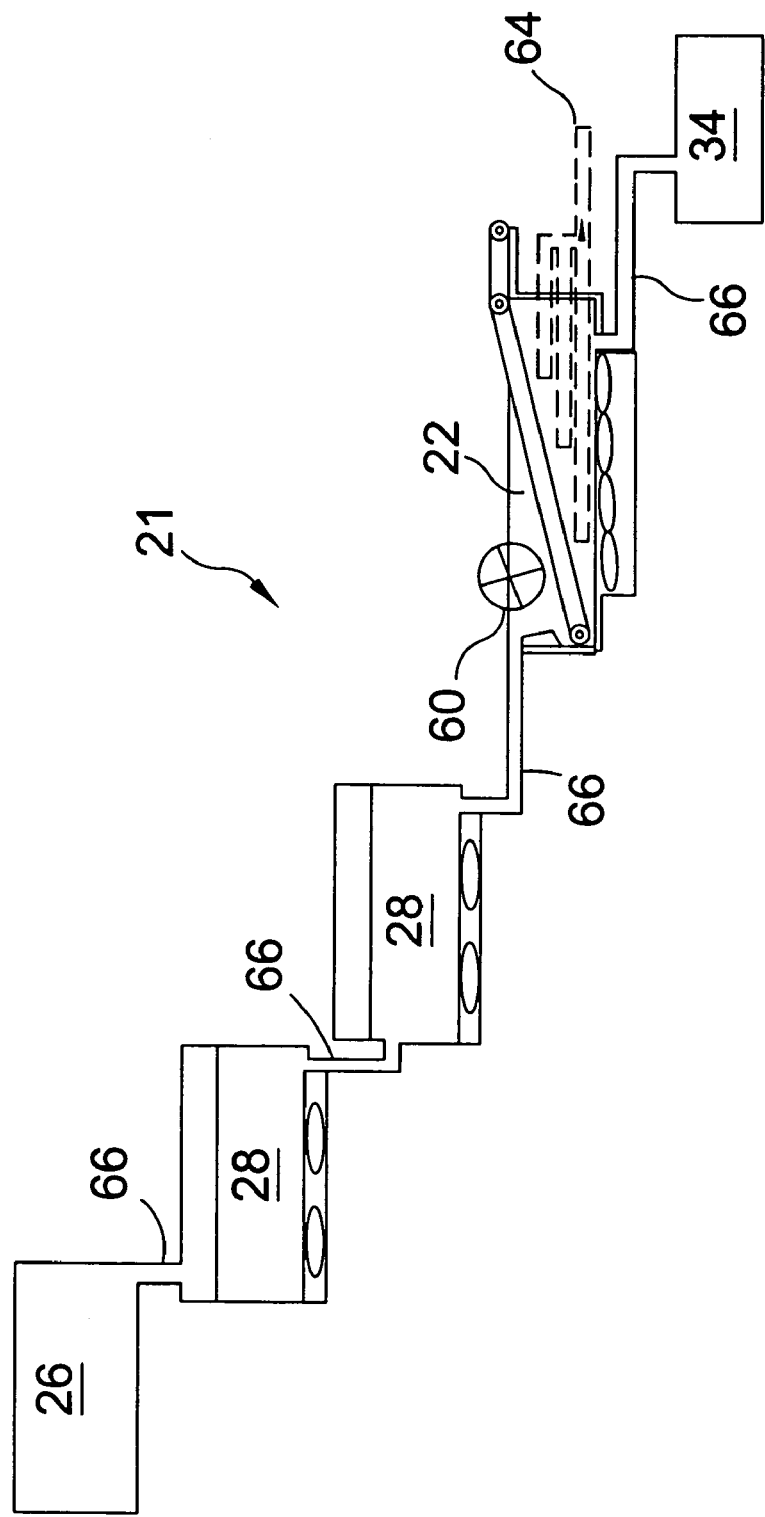
FIG. 3 is a block diagram of the boiler system.

FIG. 3 is a block diagram of the boiler system 21 demonstrating the fluid connections through conduit 66 from the brine mixing tank 26 to the auxiliary tanks 28 and the primary seafood boiler 22 and then to the broth processing system 34.

Figure 4:
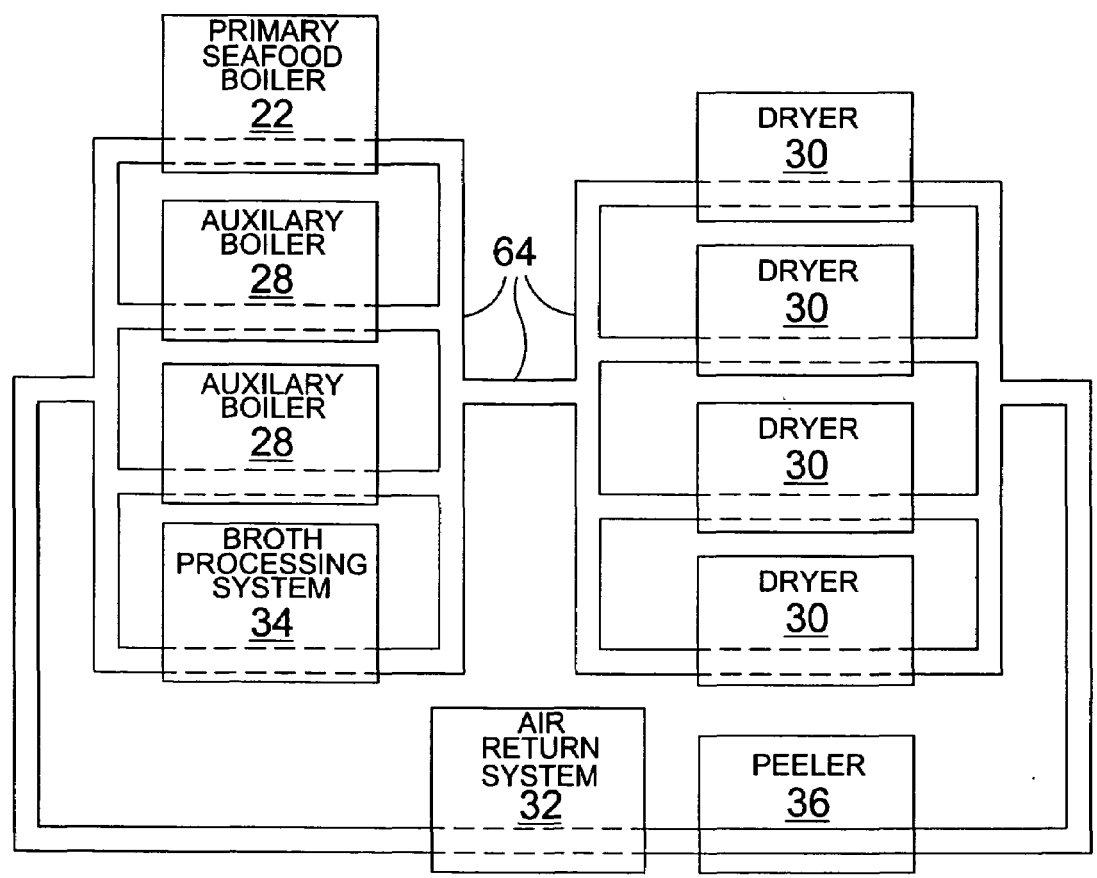
FIG. 4 is a block diagram of the heat exchange system.

FIG. 4 is a block diagram depicting the heat exchange system of the present invention 10 wherein heat is scavenged from heat-generating machinery such as the auxiliary tanks 28, the primary seafood boiler 22 and the broth processing system 34 and transferred to the dryers 30 by means of a warm air manifold 64. An air return system 32 returns the air from the dryers 30 and returns it to the heat generating machinery.

Figure 5:
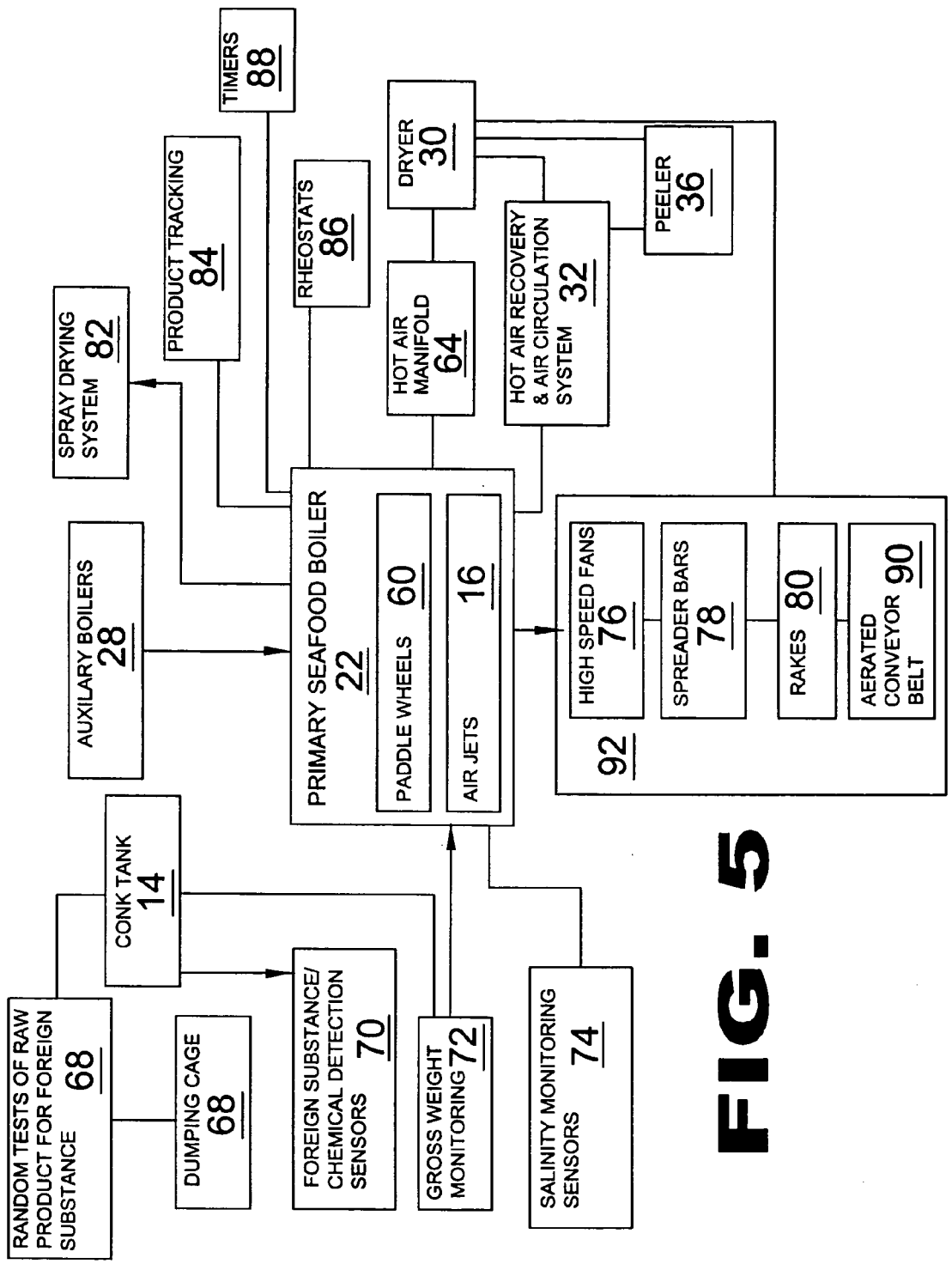
FIG. 5 is a block diagram of the present invention.

FIG. 5 is a block diagram of the present invention 10 wherein the primary seafood boiler includes paddle wheels 60 and jetted water 16 to agitate the liquid and product 18 therein. Random product testing 68 is performed prior to introduction to the system and foreign substance/chemical testing 70 is performed within the conk tank 14 to assure greater safety of the food product. Quality control in the cooking process includes a plurality of automated tests and overseer devices such as gross weight monitoring 72, salinity monitoring sensors 74, product tracking means 84, timers 88, rheostats 86 and the like. The shellfish product 18 is moved from the primary seafood boiler 22 via the primary seafood boiler conveyor 92 which has a mesh like belt to move the product 18 to the dryer 30 while letting air pass through. High speed fans 76 above the primary seafood conveyor 92 blow air over the food as it travels therealong to blow away the steam from the shellfish product 18 and cool it off to terminate the cooking process. A plurality of spreader bars 78 and rakes 80 serve to ensure that the seafood product 18 is evenly distributed over the conveyor 92. Heat is transferred from the primary seafood boiler 22 to the dryer 30 by a hot air manifold 64 and returned thereto for reheating by a hot air recovery & air circulation system 32.

Figure 6:
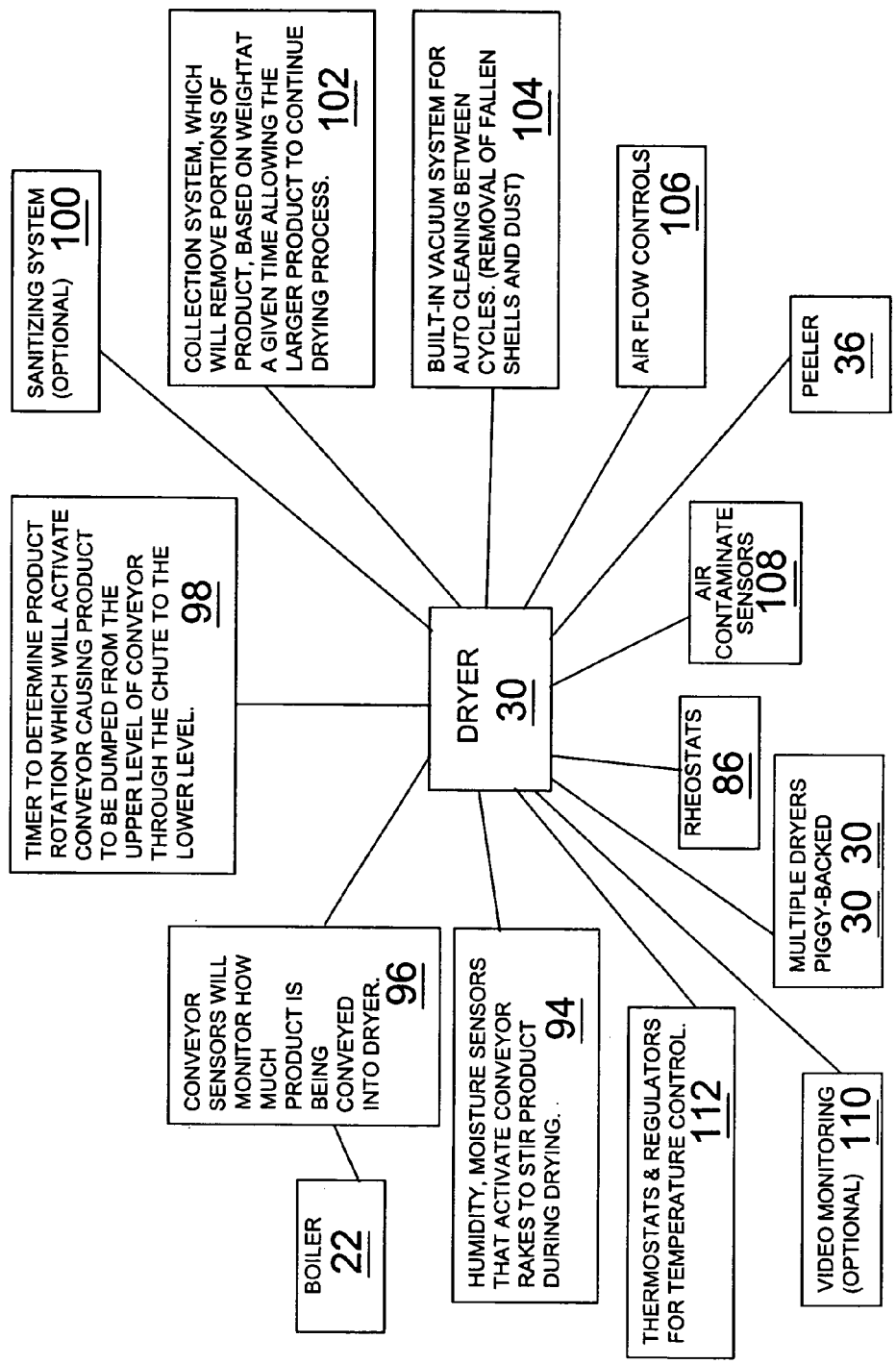
FIG. 6 is a block diagram of the dryer and its related components.

FIG. 6 is a block diagram of the dryer 30 and its related components including conveyor sensors 96 for monitoring how much product 18 is being transferred from the boiler 22 to the dryer 30. Thermostats and regulators 112 are provided for temperature control and humidity and moisture sensors 94 activate the conveyor rakes 80 to stir the product 18 during drying. Other such options to monitor and regulate the dryer 30 functions include video monitoring 110, rheostats 86, air contaminate sensors 108, air flow controls 106, and a timer 98 to determine product 18 rotation which activates conveyor causing product 18 to be dumped from the upper level of the chute to the lower level. Further options include a sanitizing system 100, a collection system 102, a built-in vacuum system 104, and video monitoring 110.

FIG. 7 is a front view of the peeler 36 and additional options associated therewith. The stainless steel outer container 112 has an opening 130 at the top for manual unloading by dumping or vacuuming cleaned product 18 therethrough. The opening 130 is also used for the auto-loading device 122. The spinning blade 128 may be fabricated of a wide variety of materials including stainless steel, aluminum, polymeric composites etc. The motor and power source 116 may be electrical, pneumatic or hydraulic. The screen 114 is constructed of a plain weave, single or double square screen or meshed material. The unloading device is a sectional piece of the screen which opens and allows the screen sweeper 126 to sweep cleaned product into the opening 130 which jets air for extraction of product 18. The hopper 112 may be mounted on a mobile tilting unit 118 with a control panel 132 for manual dumping or on a stationary stand 120 with legs 121 for use with air induced loading 122 and unloading 124 devices.

Figure 8B:
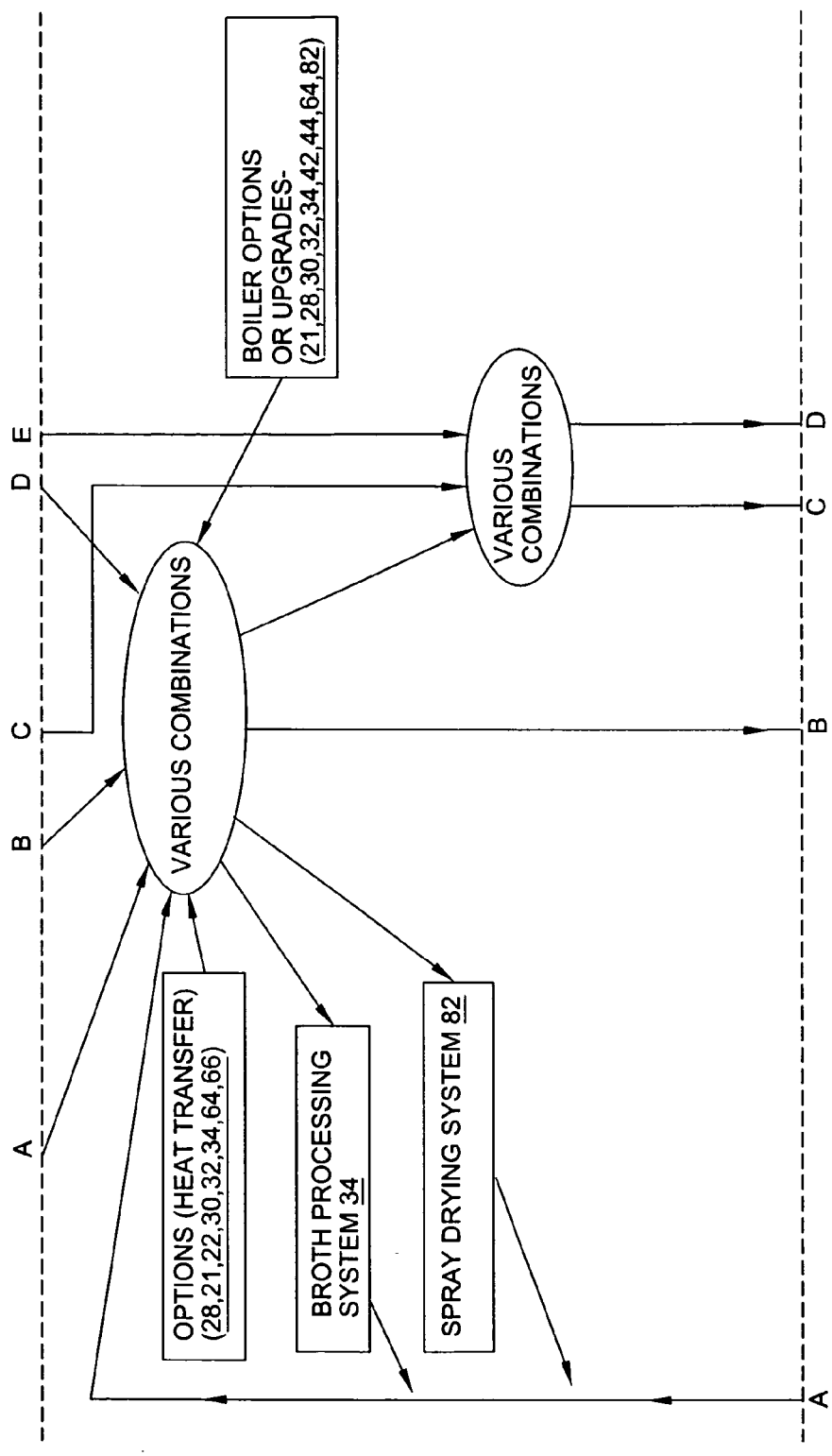
Figure 8C:
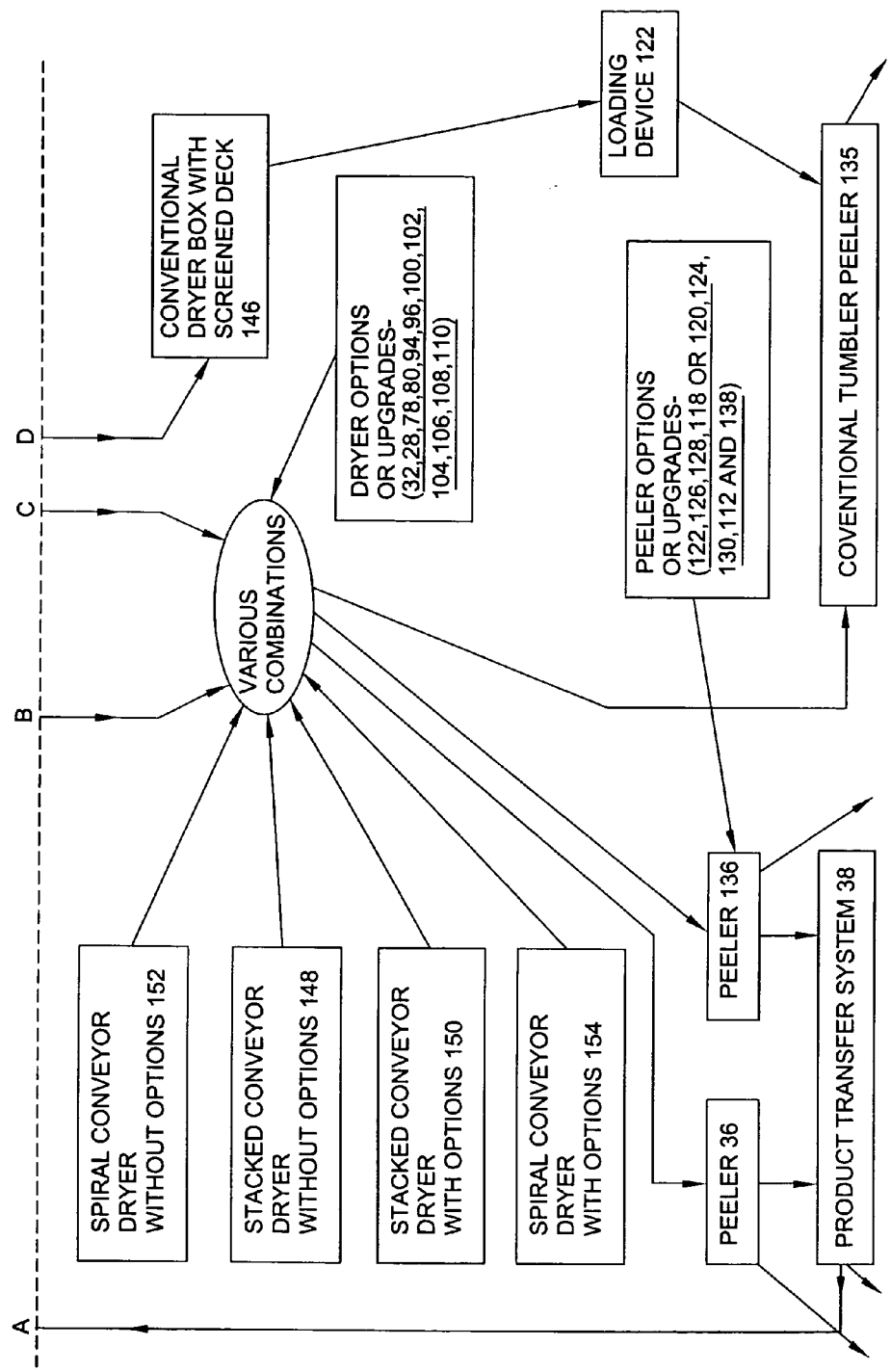

FIGS. 8A–8C is a block diagram of the seafood processing system of the present invention comprised of delivery to the conk tank, cleaning the shrimp in a conk tank, boiling the shrimp, drying the shrimp and peeling the shrimp. Anyone of these function can accomplished in whole or in part by the system of the present invention. Delivery of the shrimp to the conk tank 14 can be either manual or automated. In the automated method the shrimp is placed on either a conveyor belt 50 or product lifting unit 143 that either may have a dumping cage 58 forming an integral part therewith. The conk tank 14 is used to clean the seafood product and remove any foreign matter therefrom which may include sensor(s) for determining chemical contaminants. The conk tank 14 may also include apparatus to enhance processing of the seafood, such as water jets 16, raw product testing 46 dumping cage 58, paddle wheel 60, ice guard 62, random testing of product 68, and salinity monitoring sensor(s) 74. Once the seafood product is cleaned, it is moved either manually or mechanically to a boiler. The boiler may be a conventional boiler with lift baskets 142 or conveyor 144 or the boiler system 22 of the present invention. Each of these may incorporate additional apparatus, such as auxiliary tanks 28 and/or hot air manifold 64 providing additional functions. In addition, other processes may extend from the boiling of the seafood product, such as processing the brine solution into a broth 34 or food flavoring 82. Once boiled the seafood product is moved either manually or mechanically to a drying process. The drying process may include conventional dryer box with screened deck 146, spiral conveyor dryer 152, 154 or stacked conveyor dryer 148, 150 with each of these devices having additional apparatus, such as air return system 32, spreader bars 78, rakes 80, product tracking 84, aerated conveyor belt 90, conveyor sensors 96, sanitizing system 100, collection system 102, vacuum system 104, air flow control 106, air contaminate sensors 108 and video monitoring 110 for enhancing the functionality of the drying system. Once dried the product is transferred either manually or mechanically to a peeling process. The peeling process may include conventional tumbler peeler 135, peeler 136, and peeler 36 where each of these may include additional apparatus, such as loading device 122, screen sweeper 126, blade 128, tilting unit 118, stationary stand 120, unloading device 124, hopper 112 and screen access panel 138.

Figure 9:
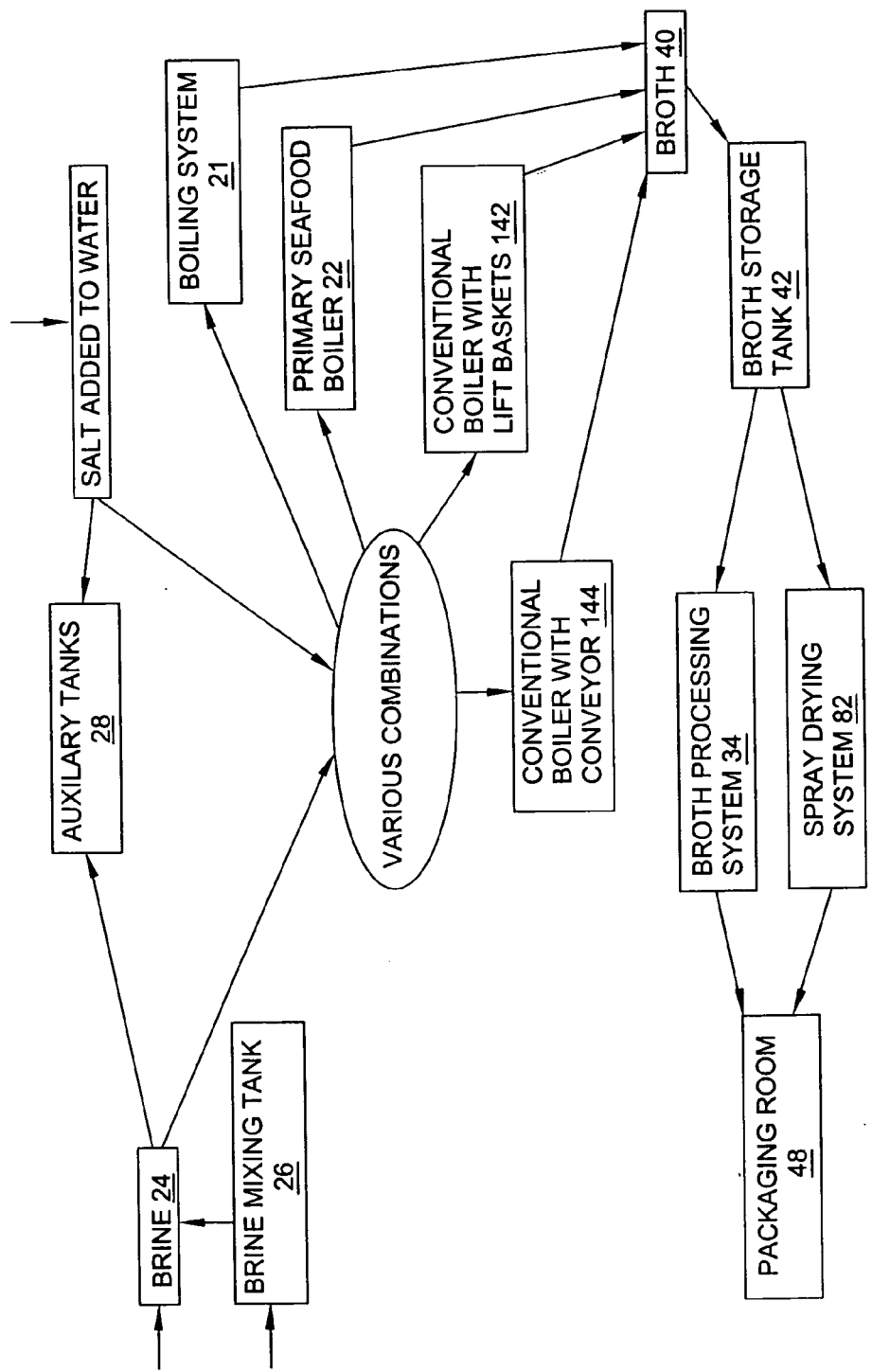
FIG. 9 is a block diagram of the brine broth processing system.

FIG. 9 shows a block diagram of an additional element of the present invention comprising a brine broth processing system 34 wherein brine 24 from the brine mixing tank 26, auxiliary tanks 28 or salt is added to water and introduced into the aforementioned boilers and under predetermined conditions the broth 40 is moved to storage tank(s) 42 where it is packaged 48 as either a brine broth 34 or spray dried 82 and packaged 48 as a food additive.

Figure 10B:
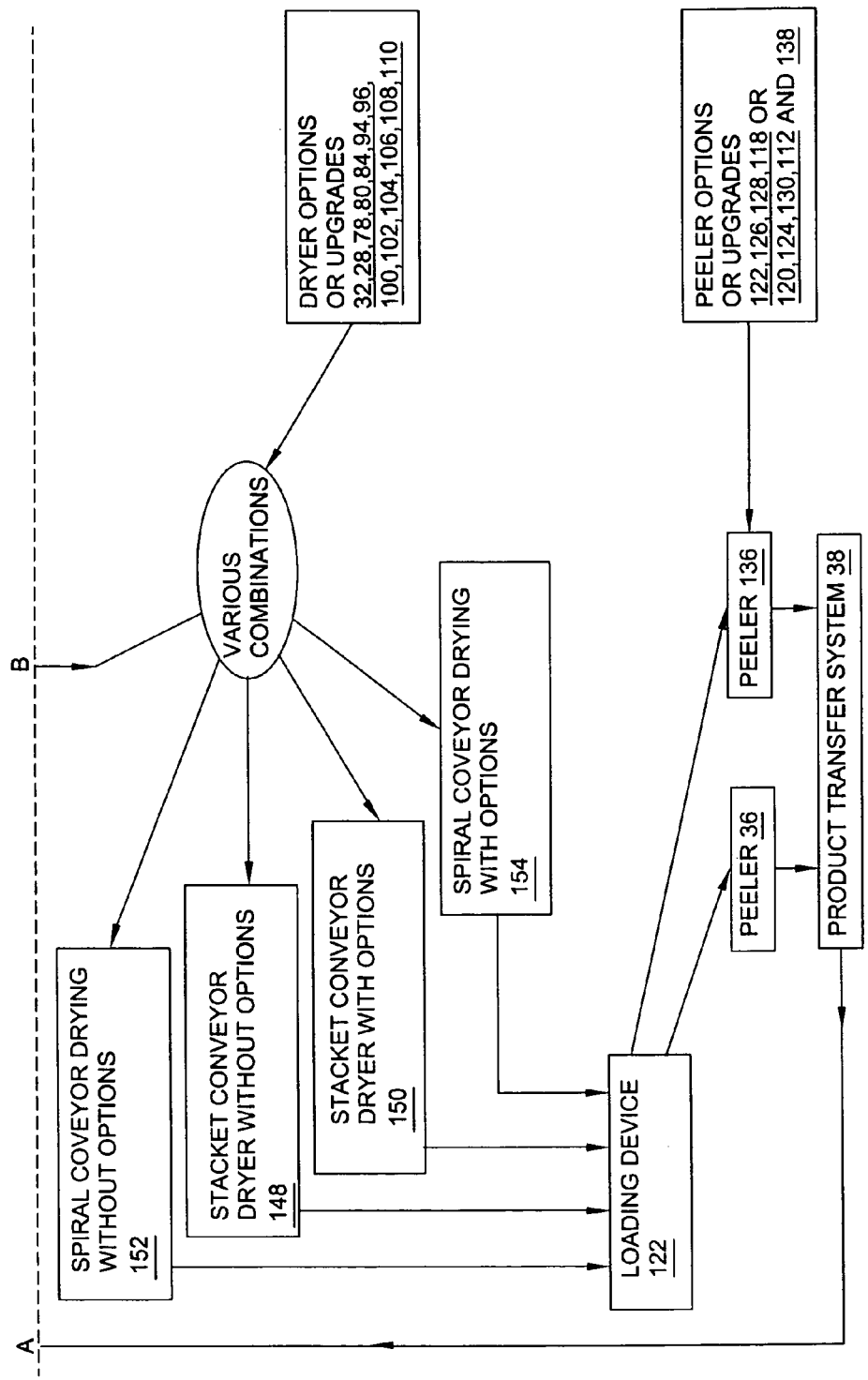

FIGS. 10A and 10B is a block diagram showing another element of the present invention comprising a heat recovery system. The system recovers heat from the aforementioned boiler systems and broth system and recycles the heat to the aforementioned boiler systems and/or dryer systems 148, 150, 152 and 154 and/or peeling devices 36, 136.

Figure 11:
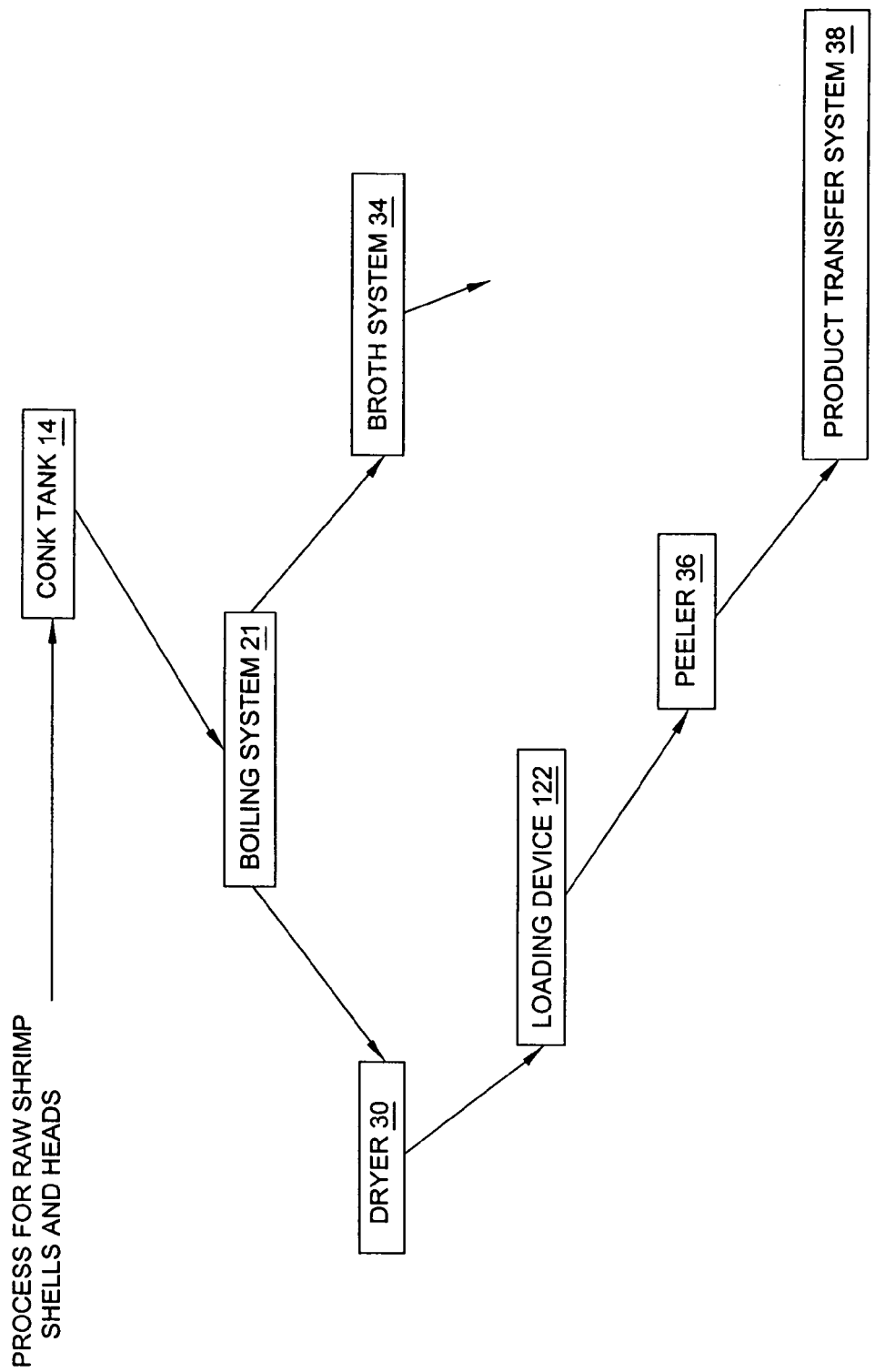
FIG. 11 is a block diagram for processing the seafood byproducts.

FIG. 11 is a block diagram showing another element of the present invention comprising processing of the byproduct shells and heads of the seafood process. As previously stated the seafood passes from the conk tank 14 to the boiler system 21 to the dryer 30 and peeler 36. The byproduct shells and heads are transferred to a product transfer system 38 and packaged for resale.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Apparatus for cooking, drying and peeling shellfish product comprising:
   a) a fluid filled conk tank for separating the shellfish product from packing ice, sea shells and other such large objects;
   b) means for automatically transporting the product to said conk tank and dumping the shellfish product into said conk tank
   c) a boiler system for supplying heated brine and cooking the shellfish product therein, said boiler system comprising:
      i) a brine mixing tank including means for introducing water therein and means for introducing salt therein to create a brine solution of a predetermined concentration in which the shellfish product is to be cooked;
      ii) a primary seafood boiler for retaining brine obtained from said brine mixing tank and maintaining said brine at a constant, predetermined temperature; and
      iii) a conduit extending between said brine mixing tank and said primary seafood boiler for selectively transporting of brine to primary mixing tank; and
      iv) at least one auxiliary boiler in line with said conduit for heating said brine to the desired temperature and storing the brine therein until called for to replenish used brine that has been removed from said primary seafood boiler; and
   d) means for automatically transferring the shellfish product from said conk tank to said boiler system.

2. Apparatus and system for cooking, drying and peeling shellfish product as recited in claim 1, further comprising means for retaining the shellfish product, wherein said means for retaining shellfish product includes at least one of a crate and a container, and
   wherein said means for automatically transporting product removes said retaining means therefrom upon said product being dumped from said retaining means into said conk tank.

3. Apparatus for cooking, drying and peeling shellfish product as recited in claim 1, further comprising:
   a) at least one dryer for dehydrating the shellfish product; and
   b) means for automatically transferring the shellfish product from said boiler system to said dryer.

4. Apparatus for cooking, drying and peeling shellfish product as recited in claim 3, further comprising:
   a) at least one peeling device for removing the heads, shells and tails from the shellfish product; and
   b) means for automatically transferring the dried shellfish product from said dryer into said peeling device and for removing the shellfish product therefrom.

5. Apparatus for cooking, drying and peeling shellfish product as recited in claim 1, further comprising automated means for separating shells and debris from finished product.

6. Apparatus for cooking, drying and peeling shellfish product as recited in claim 1, further comprising automated means for grading the shellfish product by size.

7. Apparatus for cooking, drying and peeling shellfish product as recited in claim 1, further comprising an automated means for packaging shells and dust.

8. Apparatus for cooking, drying and peeling shellfish product as recited in claim 2, wherein said automated means for transporting the retained shellfish product to said conk tank comprises:
   a) a conk tank conveyor system having a first loading end and a second dumping end, said dumping end extending above and beyond an edge of said conk tank;
   b) a dumping cage disposed proximal to said dumping end of said conveyor system positioned in a manner conducive to catching said retaining means after falling off said dumping end so an open top portion of the crate is oriented towards said conk tank thereby emptying the contents of said retaining means therein, said dumping cage being substantially open so as not to restrict passage therethrough of said shellfish product; and c) means for mechanically ejecting said retaining means from said dumping cage.

9. Apparatus for cooking, drying and peeling shellfish product as recited in claim 1, wherein said conk tank comprises:

a) a watertight housing having sidewalls and an open top;

b) a predetermined quantity of water retained within said housing; and c) means for agitating said water and lightweight objects within said conk tank.

10. Apparatus for cooking, drying and peeling shellfish product as recited in claim 1, wherein said means for transferring the shellfish product from said conk tank to said boiler system is a substantially inclined conk tank conveyor having a first lower end located at a bottom portion of said conk tank and positioned below a dumping cage, and a second, upper end extending above and beyond an opposing sidewall of said conk tank extending over said primary seafood boiler thereby permitting the shellfish product to fall therein upon reaching the end of said conk tank conveyor.

11. Apparatus for cooking, drying and peeling shellfish product as recited in claim 1, wherein said primary seafood boiler further includes means for agitating the brine and shellfish product contents therein.

12. Apparatus for cooking, drying and peeling shellfish product as recited in claim 11, wherein said agitation means includes at least one paddle wheel at a surface of the brine to keep the shellfish product moving evenly therethrough.

13. Apparatus for cooking, drying and peeling shellfish product as recited in claim 11, wherein said agitation means includes at least one jet nozzle for circulating the brine and shellfish product within the boiler.

14. Apparatus for cooking, drying and peeling shellfish product as recited in claim 1, wherein said primary seafood boiler further includes means for selectively maintaining and monitoring a specific temperature of said brine therein.

15. Apparatus for cooking, drying and peeling shellfish product as recited in claim 1, wherein said primary seafood boiler further includes salinity monitoring sensors to assure that the shellfish product is being cooked in an adequate brine mix.

16. Apparatus for cooking, drying and peeling shellfish product as recited in claim 3, wherein said means for automatically transporting said shellfish product from said boiler system to said dryer is a seafood dryer conveyor having a first lower end disposed at a bottom portion of said primary seafood boiler beneath a drop area of a conk tank conveyor and a second end extending over and beyond an opposing sidewall wherein said dryer conveyor has a substantially horizontal orientation and terminates upon introduction to said dryer.

17. Apparatus for cooking, drying and peeling shellfish product as recited in claim 16, wherein said seafood dryer conveyor further includes a plurality of high speed fans disposed over a top side of said conveyor for cooling the shellfish product and stopping the cooking process.

18. Apparatus for cooking, drying and peeling shellfish product as recited in claim 16, wherein said seafood dryer conveyor further includes a plurality of spreader bars traversing the width of said conveyor and disposed slightly thereabove at a height sufficient to permit individual pieces of shellfish product to pass thereunder and for preventing passage of stacked shellfish product until said shellfish product resides on said conveyor thereby assuring the shellfish product is evenly spread thereon for more efficient cooling.

19. Apparatus for cooking, drying and peeling shellfish product as recited in claim 16, wherein said seafood dryer conveyor further includes a plurality of rakes for turning said shellfish product to further ensure uniform cooling thereof.

20. Apparatus for cooking, drying and peeling shellfish product as recited in claim 16, wherein said seafood dryer conveyor is enclosed to prevent exposure to airborne contaminants.

21. Apparatus for cooking, drying and peeling shellfish product as recited in claim 16, further including a transport portion of said seafood dryer conveyor composed of a mesh-like belting to permit the passage of air therethrough.

22. Apparatus for cooking, drying and peeling shellfish product as recited in claim 3, further comprising a means for supplying heat to the dryers by capturing heat generated by said boiling and broth systems and transferring the captured heat thereto.

23. Apparatus for cooking, drying and peeling shellfish product as recited in claim 22, wherein said dryer heat supplying means includes a manifold integral with said boiler system and in communication with the dryers to scavenge the heat from the heat generating boilers and transfer said scavenged heat to said dryer.

24. Apparatus for cooking, drying and peeling shellfish product as recited in claim 22, wherein said dryer heat supplying means further includes an air return system for returning air to said boiler system from said dryers using fans or blowers to maintain constant air flow and recirculation.

25. Apparatus for cooking, drying and peeling shellfish product as recited in claim 3, wherein said dryers include a means for moving and rotating said shellfish product within said dryers during the drying process.

26. Apparatus for cooking, drying and peeling shellfish product as recited in claim 25, wherein said product moving and rotating means is a vertically stacked conveyor system having a plurality of staggered, parallel conveyors spaced apart one above another and moving in alternating directions, wherein the shellfish product is introduced into the dryer on a first top conveyor moving in a first direction and falls off upon reaching an end thereof and lands on a second subjacent conveyor moving in a direction opposite said first direction thereby effectively rotating said shellfish product and moving said shellfish product to an end thereof and providing said product to a further conveyor subjacent thereto until reaching a final bottom conveyor for transporting the shellfish product to another dryer or peeling device.

27. Apparatus for cooking, drying and peeling shellfish product as recited in claim 25, wherein said product moving and rotating means is a vertically stacked conveyor system having a plurality of staggered, parallel conveyors spaced apart one above another and moving in alternating directions, wherein the shellfish product is introduced into the dryer on a first top conveyor moving in a first direction and falls off upon reaching an end thereof and lands on a second subjacent conveyor moving in a direction opposite said first direction thereby effectively rotating said shellfish product and moving said shellfish product to an end thereof and providing said product to a further conveyor subjacent thereto until reaching a final bottom conveyor for transporting the shellfish product to a peeling device.

28. Apparatus for cooking, drying and peeling shellfish product as recited in claim 25, wherein said product moving and rotating device comprises a spiral platform having a substantially cylindrical chute extending medially therethrough wherein the spiral platform spirals the shellfish product upwards until reaching a top section where said product enters said chute and falls to a bottom section thereby rotating said product which is subsequently reloaded onto said spiral platform as the cycle repeats.

29. Apparatus for cooking, drying and peeling shellfish product as recited in claim 3, wherein said dryers further include vacuum bars running along a bottom portion of said dryer for vacuuming accumulated shells and shellfish product that may have fallen off said automated transfer means.

30. Apparatus for cooking, drying and peeling shellfish product as recited in claim 3, wherein said dryers further include sensors for detecting a moisture content within said shellfish product to ensure complete dehydration with no pathogen traces.

31. Apparatus for cooking, drying and peeling shellfish product as recited in claim 3, further comprising a product transfer system which utilizes suction to vacuum said shellfish product from one device to another.

32. Apparatus for cooking, drying and peeling shellfish product as recited in claim 31, wherein said at least one dryer is a spiral dryer and further comprising a peeling device and said product transfer system is utilized to move said shellfish product from said spiral dryer to said peeler.

33. Apparatus for cooking, drying and peeling shellfish product as recited in claim 4, wherein said peeling device comprises:
   a) an inner compartment having a screened bottom;
   b) an outer compartment; and
   c) a blade member that spins within said inner compartment so that the cleaned shellfish product rides along the smooth walls of said inner compartment while the heavier uncleaned shellfish product falls onto said screened bottom to continue cleaning and de-shelling process including
   separation of debris and shells from finished product by vacuum extraction and loading by-product into at least one of packages and drums;
   and working in sequence with the dryer and product transfer system, at least one of
   i. means for grading product by size,
   ii. means positioned within said inner compartment for automatically unloading finished product,
   iii. a mobile tilting unit for tilting said peeling device,
   iv. a stationary stand for retaining said peeling device therein,
   v. a screen sweeper positioned within said inner compartment and over said screened bottom for removing objects therefrom, and
   vi. a plurality of air jets for circulating said shellfish product within said inner compartment.

34. Apparatus for cooking, drying and peeling shellfish product as recited in claim 1, further comprising a broth processing system wherein used brine is extracted from said primary seafood boiler and transported to said broth processing system for preparation into a seafood flavored broth.

35. Apparatus for cooking, drying and peeling shellfish product as recited in claim 34, further comprising broth storage tanks for the storage of the finished broth product.

36. Apparatus for cooking, drying and peeling shellfish product as recited in claim 34, further comprising a broth packaging system for packaging said broth for the market.

37. Apparatus for cooking, drying and peeling shellfish product as recited in claim 1, further comprising a spray drying system wherein used brine is extracted from said primary seafood boiler and injected as a fine mist into a heated furnace where instantaneous crystallization occurs creating a solid product to be used as a shellfish product flavored salt.

38. Apparatus for cooking, drying and peeling shellfish product as recited in claim 3, wherein said dryers further comprise conveyor rakes to stir said shellfish product during drying.

39. Apparatus for cooking, drying and peeling shellfish product as recited in claim 38, further comprising moisture sensors for activating said conveyor rakes.

40. Apparatus for cooking, drying and peeling shellfish product as recited in claim 39, wherein said dryers further include a temperature control.

41. Apparatus for cooking, drying and peeling shellfish product as recited in claim 40, wherein said temperature control comprises:
   a) thermostats; and
   b) regulators.

42. Apparatus for cooking, drying and peeling shellfish product as recited in claim 3, wherein said dryers further include air contaminate sensors for detecting a presence of at least one of contaminates and toxins within said dryer.

43. Apparatus for cooking, drying and peeling shellfish product as recited in claim 42, further comprising an alarm and notification mechanism in communication with said air contaminate sensors to notify an operator of a potentially hazardous condition.

44. Apparatus for cooking, drying and peeling shellfish product as recited in claim 3, wherein said dryers include a video monitoring device to allow an operator to observe the operation within the dryers.

45. Apparatus for cooking, drying and peeling shellfish product as recited in claim 3, wherein said dryers further include rheostats.

46. Apparatus for cooking, drying and peeling shellfish products as recited in claim 1, further comprising a computerized monitoring system and central data base to oversee all operational phases of said apparatus including performing, monitoring, maintaining and controlling of at least one of:
   a) video and audio monitoring devices;
   b) chemical detection;
   c) product tracking;
   d) production schedules;
   e) gross weights of product;
   f) yields of product;
   g) critical control points;
   h) product water activity;
   i) moisture content sensors;
   j) heat sensors for air and water;
   k) heat, water and air flow control system;
   l) salinity monitoring;
   m) boiling/drying/peeling timers and controls;
   n) HAACP guidelines and regulations;
   o) FDA (Dept. of Health) inspection and production forms;
   p) quality control;
   q) system and process troubleshooting;
   r) tips for GMP's;
   s) raw product testing;
   t) alarms and notification;
   u) product (size) grading;
   v) thermostats;
   w) regulators;
   x) LED control panel; and
   y) rheostats.

* * * * *